(12) United States Patent
Dandrea, Jr.

(10) Patent No.: US 8,662,671 B1
(45) Date of Patent: Mar. 4, 2014

(54) IMAGE TRANSFER APPARATUS

(76) Inventor: Anthony A. Dandrea, Jr., Elmira, NY (US)

( * ) Notice: Subject to any disclaimer, the term of this patent is extended or adjusted under 35 U.S.C. 154(b) by 356 days.

(21) Appl. No.: 13/184,612

(22) Filed: Jul. 18, 2011

(51) Int. Cl.
G03B 21/26 (2006.01)

(52) U.S. Cl.
USPC .............................................. 353/28; 353/22

(58) Field of Classification Search
USPC ................................... 353/22, 28; 434/85, 88
See application file for complete search history.

(56) References Cited

U.S. PATENT DOCUMENTS

| | | | |
|---|---|---|---|
| 3,323,415 A | 6/1967 | Tobias | |
| 3,476,473 A * | 11/1969 | Fend | 353/28 |
| 3,950,085 A | 4/1976 | Grimm | |
| 5,052,797 A | 10/1991 | Madsen | |
| 5,632,544 A | 5/1997 | Dandrea, Jr. et al. | |

* cited by examiner

Primary Examiner — Thanh Luu
(74) Attorney, Agent, or Firm — Mark Levy; Hinman, Howard & Kattell, LLP

(57) ABSTRACT

The present invention features an optical apparatus for the transmission of a virtual image to facilitate an individual's copy or reproduction thereof onto a working surface. The optical apparatus provides an image transfer that is more realistic than apparatuses of the prior art because of the illusion that the image is in actual contact with the working surface, when in reality the image impinges only a transparent medium. In addition, the invention provides a more effective image transfer than conventional devices by not including an opaque transfer of the artist's hand and/or art utensil, but rather by rendering the illusion that the artist's hand and/or art utensil is transparent. The optical apparatus consists of a supporting frame upon which is mounted a light source, an upper transparent support plate, a lower plate consisting of at least two layers, and a working surface on which is disposed canvas or paper for receiving the artist's final, copied image or work.

17 Claims, 2 Drawing Sheets

IMAGE TRANSFER APPARATUS

FIELD OF THE INVENTION

The present invention pertains to optical image transfer apparatuses and, more particularly, to an optical apparatus for the transmission of an image (such as a photograph) from an image plate mounting to a substantially transparent medium (such as a glass or Plexiglas plate) positioned above a drawing surface medium which is supported upon a platform that is carried by a frame.

BACKGROUND OF THE INVENTION

It has long been recognized in the field of commercial art that an artist can produce a drawing from a static image by optically transmitting that image onto a working surface, such as a canvas or a drawing paper, by utilizing reflective or semi-reflective surfaces.

To accomplish the aforesaid optical transmission of an image, numerous devices have been fabricated (as illustrated in U.S. Pat. Nos. 3,323,415; 3,476,473; and 5,052,797).

The use of reflective or semi-reflective surfaces to accomplish image transmission has one serious drawback. Very often, the transmitted or transferred image is visually obstructed by the artist's hand and/or by the artist's hand-held utensil.

Consequently, when doing their work, commercial artists have adapted themselves to ignore or disregard the obstructed work surface area, as presented by an opaque hand and/or artist's tool. The view of the solid, unwanted hand and/or utensil nonetheless remains a disruptive or annoying inconvenience, which is tolerated and accepted as a natural convention over which an artist has no control.

U.S. Pat. No. 5,632,544 discloses an optical apparatus for the transmission of a virtual image to facilitate an individual's copy or reproduction thereof onto a working surface. The optical apparatus provides an image transfer that is more realistic than apparatuses of the prior art because of the illusion that the image is in actual contact with the working surface, when in reality the image impinges only a transparent medium. In addition, the invention provides a more effective image transfer than conventional devices by not including an opaque transfer of the artist's hand and/or art utensil, but rather by rendering the illusion that the artist's hand and/or art utensil is transparent. The optical apparatus consists of a supporting frame upon which is mounted a light source, an upper transparent support plate, a lower plate, and a working surface on which is disposed canvas or paper for receiving the artist's final, copied image or work.

U.S. Pat. No. 3,950,085 by Grimm discloses an optical transformation drawing apparatus in which an image is projected by a projector on to a rear face of a projection screen so that a draftsman can trace on the front face of the screen the image transmitted through the screen, both the projection screen and a projector support frame supporting the projector are mounted on a fixed frame to pivot about an axis with the projector support frame and the projector thereon acting as a counterweight for the screen and with the projector support frame arranged parallel to the pivot axis, a mirror being provided to deflect the image from the projector on to the rear face of the screen.

One of the objects of the present invention is to provide the transmission of an image without an observer having to view the opaque obstruction of his or her hand and/or utensil onto a glass or Plexiglas plate positioned above the working surface.

The current invention also seeks to render the illusion of transferring an image to a work surface, such as a canvas or drawing paper, whereby that image appears to be in actual contact therewith, and, therefore, providing a more realistic and more workable view of the image to be reproduced.

Another object of the invention is to give the artist the ability to draw or paint a picture or portrait to a more exact dimension and likeness of a subject without having to contend with the intermittent body movement of a live model.

Still another object of the invention is to prevent any distortion of an image when a foreign object is placed between a second plate made of glass, clear plastic or the like and the working surface, regardless of the object's shape, density or color.

A further object of the invention is to reduce the time normally required to render a portrait or a sketch.

SUMMARY OF THE INVENTION

The present invention features an optical apparatus for the transmission of a virtual image to facilitate an individual's copy or reproduction thereof onto a working surface. The optical apparatus provides an image transfer that is more realistic than apparatuses of the prior art because of the illusion that the image is in actual contact with the working surface, when in reality the image impinges only a transparent medium. In addition, the invention provides a more effective image transfer than conventional devices by not including an opaque transfer of the artist's hand and/or art utensil, but rather by rendering the illusion that the artist's hand and/or art utensil is transparent. The optical apparatus consists of a supporting frame upon which is mounted a light source, an upper transparent support plate, a lower plate, and a working surface on which is disposed canvas or paper for receiving the individual's final, copied image or work.

The optical apparatus of this invention comprises a supporting frame upon which is mounted an overhead light source. The light source is beamed at an upper transparent support plate, upon which is mounted a masked image source (such as a masked photograph, transparency or drawing). The light from the light source is projected via masked image to a lower, angled, transparent plate having at least two layers that are disposed below the image. The projected image impinges on the lower transparent plate, while appearing transparent to the degree that the artist can actually see through the projected image and observe a working surface at the same time. Although the image is not actually transferred through the lower, angled, transparent plate to the working surface, it appears to be in direct contact therewith. With the illusion that the image is in physical contact with the working surface, the artist can easily and accurately employ a utensil (such as a pencil, brush or marker) to reproduce the image upon a canvas or drawing paper disposed on the working surface.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like elements and components will bear the same numerical designations throughout the FIGURES.

DESCRIPTION OF THE PREFERRED EMBODIMENT

Generally speaking, the invention features an improved optical image transfer apparatus. The optical apparatus transfers an image contained in a photograph, transparency or drawing to an angled glass or Plexiglass plate positioned above a working surface, while allowing the artist's hand and/or the artist's tool to appear transparent so that an unobstructed view thereof is achieved. In another embodiment, a magnifying lens and an additional angled plate are employed to enlarge the image being transferred. In either embodiment, the transferred image will appear to be directly in contact with the working surface, thus providing a more realistic projection than other apparatuses of its kind.

Figure 1:
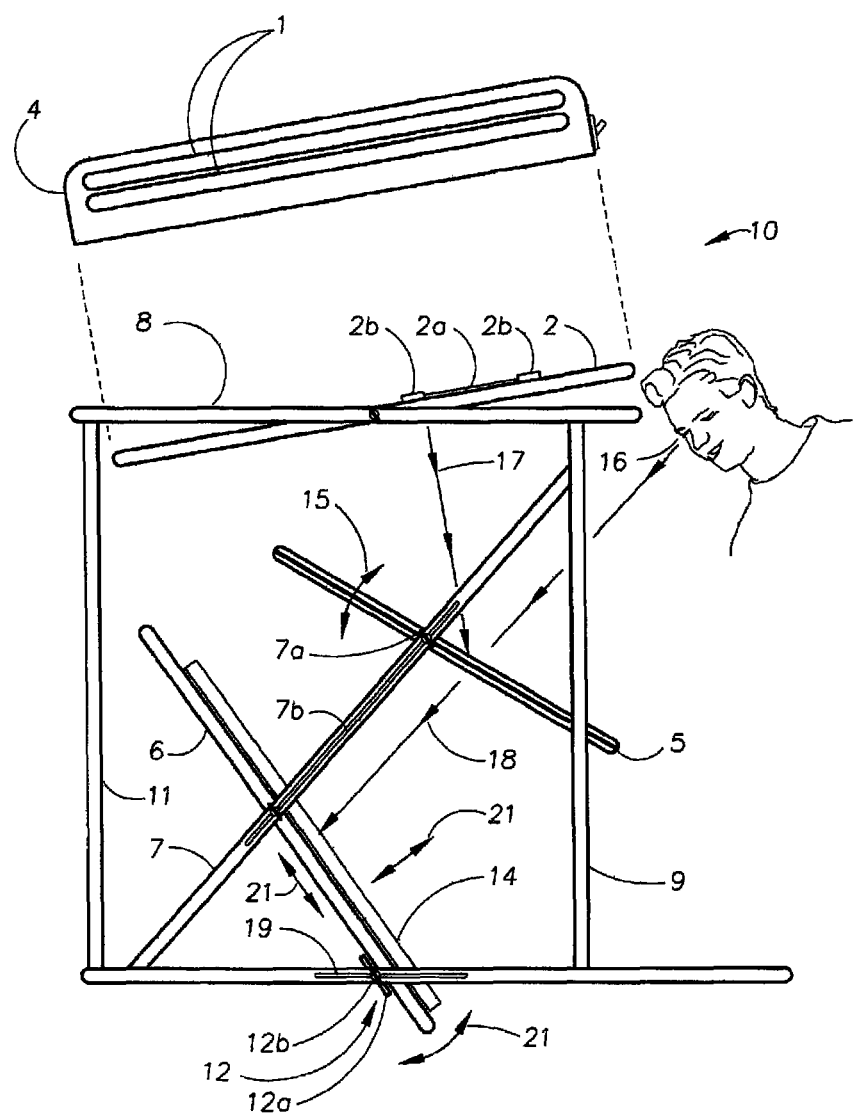
FIG. 1 illustrates a schematic side view of the optical image transfer apparatus of this invention.

Now referring to FIG. 1, an optical image transfer apparatus 10 of this invention is shown in schematic side view. The apparatus 10 comprises a frame that is fashioned like a draftsman's drawing easel and defined by vertical frame supporting members 11 and 9. Frame supporting members 11 and 9 support a cross bar 8, on which is mounted an upper, transparent support plate 2. Disposed on the upper surface of the support plate 2 is an image 2a, such as a photograph, print, transparency, drawing or other suitable, original artwork. Layered on the artwork 2a is a suitable opaque mask 2b for framing the image and preventing excess light at the borders of the artwork 2a from escaping downward toward the lower transparent plate 5.

Connected to support plate 2 is an overhead housing 4, in which a light source 1 is mounted. The light source 1 can comprise a plurality of incandescent or fluorescent light bulbs. Light from the light source 1 is beamed downwardly (arrows 17) to an angled, lower transparent plate 5. The transparent plates 2 and 5, supported by frame members 11 and 9, can be glass, Plexiglas, plastic, etc.

Lower transparent plate 5 is also known as an image receiver plate 5. It has been found that forming a multi-ply layer 5 of transparent material is unexpectedly advantageous in eliminating a double image and increasing sharpness of the single image. A single plate having a thickness of 1/8" or greater would create a double image due to the upper and lower surfaces thereof reflecting the same image. Even identical plates or layers have different grains which, when placed parallel and proximate each other, have been found to enhance the image. The preferred embodiment of the invention has been found to be a sheet of plastic 1/16" thick and a sheet of Plexiglas® material 1/16" thick laid atop the plastic. The thickness of the two parallel plates, together, is thus preferably no greater than 1/8". The plates are connected or attached to one another by means known in the art, so that they may be rotated together, as described herein below. For purposes of this description, the terms "lower transparent plate 5" and "image receiver plate 5" are both meant to refer to a multi-ply (preferably two-ply) layer of transparent material.

The light passing through the image 2a will pick up the features of the image and transfer the image (arrows 17) to the lower, angled plate 5. A working surface 14 is mounted to an easel-like support 6. The working surface 14 can comprise a canvas, drawing paper or Mylar-type transparency. The easel-like support 6 is mounted to the frame member 11 by an adjustable assembly 12 consisting of an angling plate 12a and a wing nut 12b. Assembly 12 can change the angle of the support, as shown by arrows 21, to reposition the plane of the working surface 14 and to raise and lower it relative to frame 11. The support member 11 has a slot 19 in which rides adjustable assembly 12. The angle is changeable so as to provide not only a comfortable viewing angle for the artist, but also, in conjunction with adjustments of other plates 2 and 5, to focus and position the transmitted image, so that it appears to impinge precisely on the working surface 14.

Lower plate 5 can have a slightly reflective surface (approximately 3% light reflectance). The plate 5 receives the beamed image from above, where it remains and can be viewed by the artist. An additional cross bar 7 is attached to frame members 9 and 11 and pivotally and slidably supports lower transparent plate 5 at a pivot point 7a. Appropriate slots 7b are provided in cross bar 7 for adjusting lower plate 5 relative to the position of the remaining components to achieve focus. The angle of the lower transparent plate 5 results from its rotation (arrows 15) about the pivot point 7a. The angle of plate 5 is adjusted and fixed by a wing nut fastener (not shown) that locks the plate 5 against the rotation 15.

An observer (e.g., an artist), whose eye is represented by element 16, views (arrows 18) the transferred image on the lower, angled plate 5, as shown. The image of the apparatus 10 will appear to the artist's eye 16 to be directly in contact with the work surface 14. The artist will draw, paint or ink the work surface 14 with the proper utensil (held in the hand of the artist) below plate 5 and in contact with the work surface 14. Being beneath and isolated from the projected image beam, the arm hand and/or drawing utensil of the artist will, therefore, appear transparent, rather than opaque. This opaqueness is a major drawback that is common to other types of projection devices. The effect of this system is that the image reflected back to the artist's eye 16 presents a transparent arm hand and/or artist's utensil (any object that is placed between the image receiver plate and the working surface—hand, arm, drawing utensil, etc.), along with the image on the work surface 14.

Figure 2:
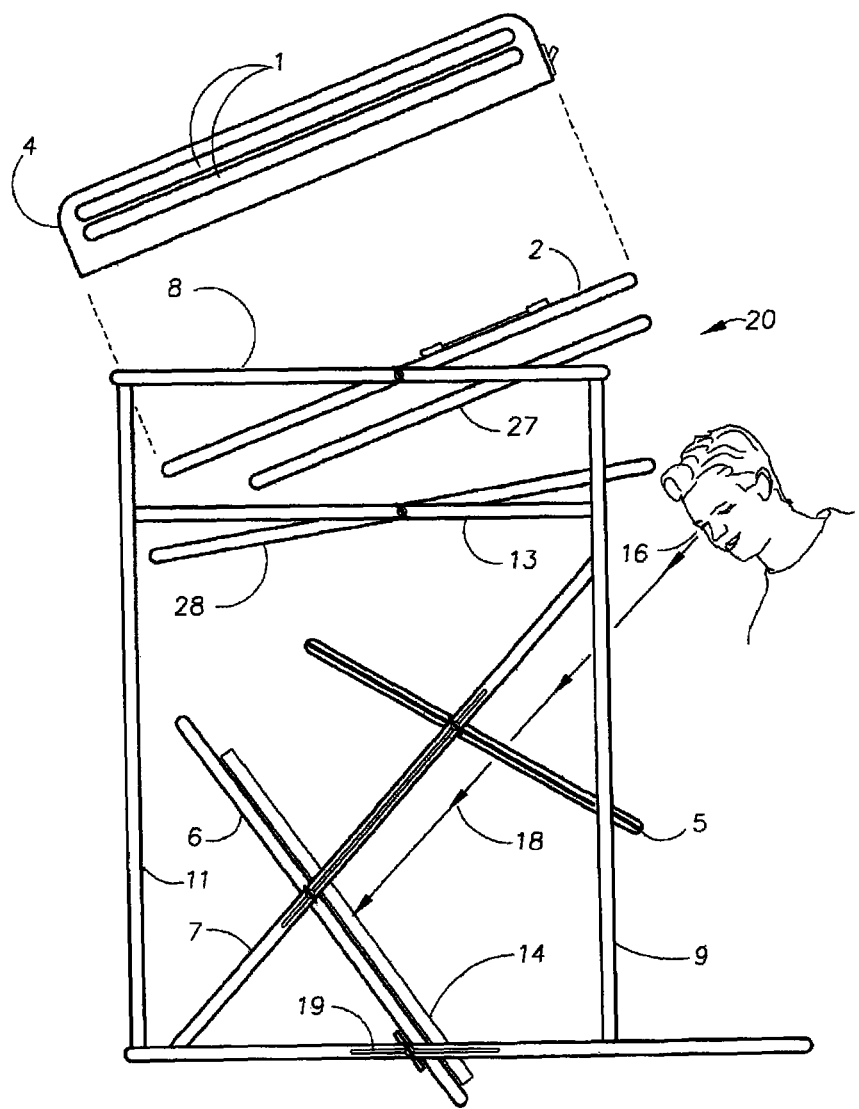
FIG. 2 shows a schematic side view of an alternate embodiment of the optical image transfer apparatus depicted in FIG. 1.

Now referring to FIG. 2, an alternate embodiment 20 of the optical apparatus 10 (FIG. 1) is shown in schematic side view. The alternate embodiment 20 contains two added elements 27 and 28. Element 27 comprises a magnifying or modifying lens, such as a Fresnel lens, that will enlarge, reduce, distort or otherwise modify the image being projected downwardly towards lower, transparent plate 5. Lens 27 is adjustably supported by cross bar 8 by suitable means. Unexpectedly, the magnifying/modifying lens 27 causes the artist's hand to appear when being viewed (arrows 18) by the artist's eye 16. Therefore, if the artist wants to regain the transparent hand feature, it becomes necessary to introduce an additional, compensating, transparent plate 28 between plates 5 and 2. The compensating, transparent plate 28, supported by an additional cross bar 13, restores the transparent view of the artist's hand. The angle adjustment for compensating, transparent plate 28 can be similar to that of plate 5 about its supporting frame members 13 and 9.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An optical apparatus for providing an appearance that the image of an original artwork on a mounting surface is projected upon a working surface, said optical apparatus comprising:
   a supporting frame being defined by a vertical support axis;
   lighting means comprising a source of light, said lighting means capable of projecting an image, with said lighting means being mounted upon said supporting frame;
   a substantially transparent medium being supported upon said supporting frame for receiving said projected image, said substantially transparent medium comprising at least two parallel plates, a lower plate comprising plastic and an upper plate laid atop said plastic and comprising Plexiglas® material, the total thickness of said at least two parallel plates being no greater than ⅛", and being angled with respect to said vertical support axis of said supporting frame;
   artwork support means supported by said supporting frame and disposed between said substantially transparent medium and said lighting means; and
   means defining a working surface upon which an image of said artwork appears to be projected, when viewed through said substantially transparent medium, said working surface being disposed adjacent said substantially transparent medium, and being supported by said supporting frame, said working surface being angled with respect to said vertical support axis of said supporting frame.

2. The optical apparatus in accordance with claim 1, wherein said substantially transparent medium comprises glass.

3. The optical apparatus in accordance with claim 2, wherein said glass has a reflectance of approximately three percent.

4. The optical apparatus in accordance with claim 1, wherein said substantially transparent medium comprises means for adjusting the angle thereof with respect to said vertical support axis.

5. The optical apparatus in accordance with claim 1, wherein said working surface has support means that comprises angle adjustment means for adjusting the angle thereof with respect to said vertical support axis of said supporting frame.

6. The optical apparatus in accordance with claim 1, wherein said artwork support means comprises a transparent medium and a mask disposed thereover for masking said artwork.

7. The optical apparatus in accordance with claim 1, further comprising a lens disposed between said artwork support means and said substantially transparent medium for modifying said projected image.

8. The optical apparatus in accordance with claim 7, wherein said lens is a magnifying lens.

9. The optical apparatus in accordance with claim 7, wherein said lens is a reducing lens.

10. The optical apparatus in accordance with claim 7, wherein said lens is a distorting lens.

11. The optical apparatus in accordance with claim 9, further comprising a compensating, transparent medium disposed adjacent said magnifying lens for rendering an artist's hand and tool invisible in said projected image.

12. An optical apparatus for providing an appearance that the image of an original artwork is projected upon a working surface, said optical apparatus comprising:
   a supporting frame being defined by a vertical support axis;
   lighting means comprising a source of light, said lighting means capable of projecting an image, with said lighting means being mounted upon said supporting frame;
   a first substantially transparent medium being supported upon said supporting frame adjacent said lighting means for supporting an original artwork to be reproduced;
   a second substantially transparent medium comprising at least two parallel plates, a lower plate comprising plastic and an upper plate laid atop said plastic and comprising Plexiglas® material, the total thickness of said at least two parallel plates being no greater than ⅛", and supported by said supporting frame, said second substantially transparent medium being disposed between said first substantially transparent medium and a working surface, said image reflecting off of said second substantially transparent medium towards a viewer disposed over said second substantially transparent medium and said working surface, a view of said working surface passing through said second substantially transparent medium and melding with said image reflected from said second substantially transparent medium, and thereby appearing as if said image was disposed upon said working surface; and
   a lens disposed between said first and second substantially transparent mediums for modifying said image;
   whereby the appearance is that said image is projected upon said working surface so that an artist can reproduce said original artwork on said working surface with no visual interference of the artist's hand and tools.

13. The optical apparatus in accordance with claim 12, wherein said second substantially transparent medium comprises a reflectance of approximately three percent.

14. The optical apparatus in accordance with claim 12, wherein said second substantially transparent medium comprises means for adjusting the angle thereof with respect to said vertical support axis.

15. The optical apparatus in accordance with claim 12, wherein said working surface has support means that comprises angle adjustment means for adjusting the angle of said working surface with respect to said vertical support axis of said supporting frame.

16. The optical apparatus in accordance with claim 12, wherein said first substantially transparent medium comprises a mask disposed over said transparent medium for masking said original artwork.

17. An optical apparatus for providing an appearance that the image of an original artwork on a mounting surface is projected upon a working surface, said optical apparatus comprising a supporting frame, means defining a work surface, a substantially transparent medium and means for projecting an image from said substantially transparent medium towards a viewer disposed over said substantially transparent medium and said work surface, said image melding with a view of said work surface, whereby said image appears as if it is disposed upon said work surface, said substantially transparent medium comprising at least two parallel plates, a lower plate comprising plastic and an upper plate laid atop said plastic and comprising Plexiglas® material, the total thickness of said at least two parallel plates being no greater than ⅛", and being coupled to the supporting frame and angled with respect to a vertical support axis of said supporting frame, said working surface being disposed adjacent said substantially transparent medium and being coupled to the supporting frame and angled with respect to said vertical support axis of said supporting frame.

* * * * *